United States Patent Office 3,525,233
Patented Aug. 25, 1970

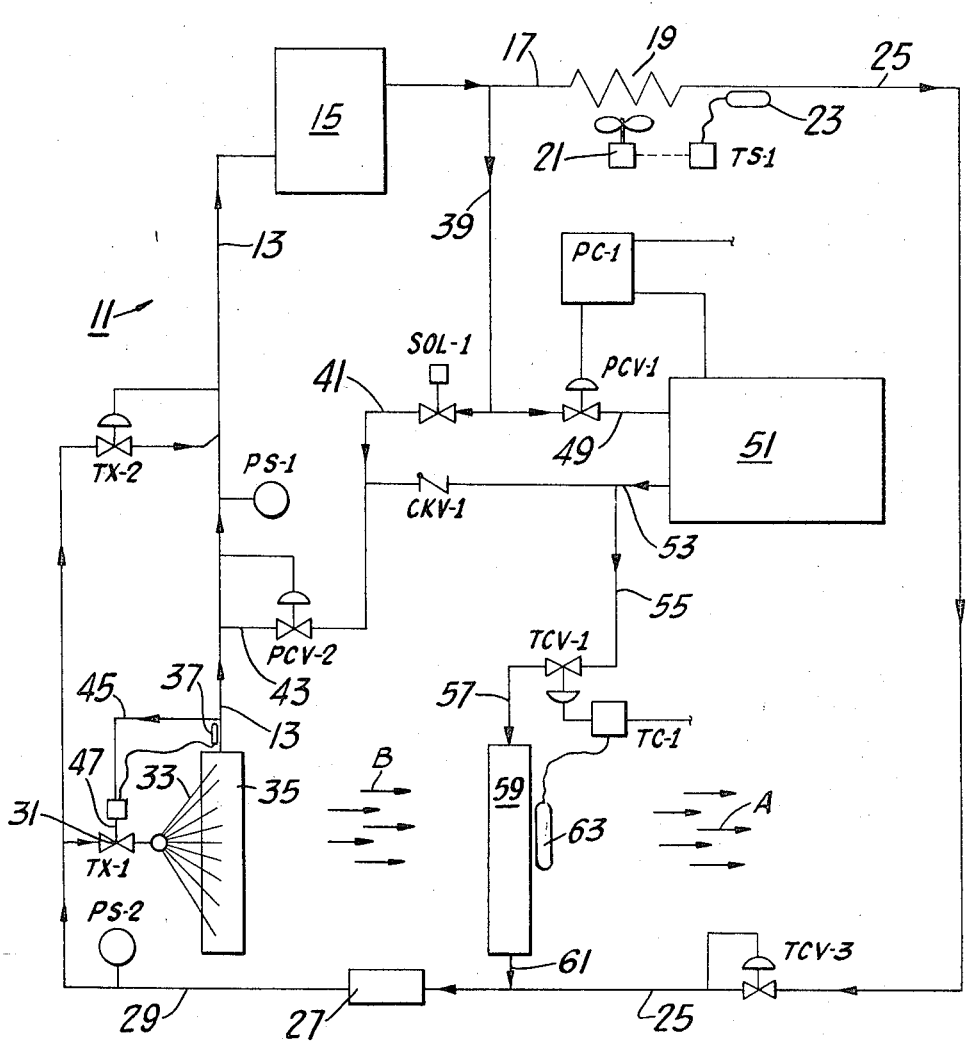

3,525,233
HOT GAS BY-PASS TEMPERATURE CONTROL SYSTEM
Robert W. Pond, Bethel Park, Pa., assignor, by mesne assignments, to American Air Filter Company, Inc., a corporation of Delaware
Filed Dec. 26, 1968, Ser. No. 786,941
Int. Cl. F25b 29/00
U.S. Cl. 62—173   6 Claims

ABSTRACT OF THE DISCLOSURE

In a refrigeration cooling system there is provided a stabilizing medium which acts as a heat sink and refrigerant pressure equilizer, whereby conventional cooling coil in such refrigeration system operates at nearly perfect, non-fluctuating presure and temperature to effect close temperature and humidity control in a habitable facility.

BACKGROUND OF THE INVENTION

Certain activities, such as the machining of small metal parts for fits having extremely close tolerances has, heretofore, been hampered by the presence of dirt and other airborne contaminants in the environmental facilities where such activities are carried on. The need for a high order of cleanliness in such facilities has become increasingly apparent. But, it has been difficult heretofore to maintain the temperature in an environmental room within very small range of fluctuations for several reasons. One reason is that there is very little heat generated in such room, and another reason is that the environmental room is usually located within a larger room facility. Further, little or no heat passes through the walls of the environmental room which makes it difficult to maintain the temperature and humidity in such environmental room within the close tolerances usually established. Yet, for certain operations, it is essential that the temperature within such an environmental room be maintained within the order of $\frac{1}{10}$ of a degree of temperature above or below a preselected temperature.

Temperature control systems available in the prior art, of which I am aware, have not been effective in maintaining the temperature of an environmental room within the prescribed limits and therefore they have not been entirely satisfactory.

Those skilled in the art, however, will recognize that the system of the present invention is effective and efficient in maintaining the temperature of an environmental room within a very small preselected temperature range.

SUMMARY OF THE INVENTION

The improvement in a refrigeration system comprising a first means for carrying a portion of the hot pressurized gaseous refrigerant to a receptacle, and second means for carrying the hot gaseous refrigerant to a means for heating air chilled by the refrigeration system.

For a further understanding of the present invention and for advantages and features thereof, reference may be made to the following description taken in conjunction with accompanying drawing which shows, for the purpose of exemplification, a preferred embodiment of the invention.

BRIEF DESCRIPTION OF THE DRAWING

The drawing shows schematically an improved temperature control system in accordance with the invention for an environmental room.

DETAILED DESCRIPTION

The drawing illustrates schematically a system 11 for controlling the temperature within an environmental room which is heated or cooled by means of a flow of air moving in the direction of arrows A into the room (not shown) such as a clean room or other habitable space.

A compressor 15, of the type used in refrigerating systems, compresses a suitable gaseous refrigerant, flowing to the compressor in a refrigerant suction conduit 13. The compressor 15 compresses the suitable gaseous refrigerant, which may be Freon-22 or the like, to a preselected pressure, and the pressurized hot refrigerant gas flows from the compressor 15 through conduit 17 into a conventional condenser 19, which is provided with a fan 21 that operates under control of a heat sensor 23 and switch TS-1. Under control of the heat sensor 23, the switch TS-1 blows air over the cooling coils of the condenser 19 when the temperature of the refrigerant in conduit 25 is above a preselected temperature. The gaseous refrigerant condenses to a liquid in the condenser 19.

The pressurized liquid refrigerant then flows in conduit 25 through a self-regulating pressure control valve TCV-3 which monitors the flow of refrigerant within a preselected pressure range. The liquid refrigerant flows thence into a conventional receiver 27.

From the liquid refrigerant receiver 27, the refrigerant flows in conduit 29 through a conventional thermal expansion valve 31 and into a liquid refrigerant distributor 33 that carries the refrigerant into a direct expansion cooling coil 35. A suction line sensor 37 is in fluid communication with the thermal expansion valve 31 to regulate it and to control it. Also, a pressure switch PS-2 is provided in conduit 29 to monitor the pressure in such conduit.

Liquid refrigerant that enters the direct expansion cooling coil 35 is under considerable pressure, but in the direct expansion cooling coil 35, the liquid refrigerant, at reduced pressure and temperature, evaporates with inward refrigeration heat flow, and becomes a refrigerant vapor. The refrigerant vapor leaves the direct expansion cooling coil 35 via the conduit 13 and returns to the compressor 15, where the vaporous refrigerant is compressed and the cycle commences again.

Air, which flows in the direction of arrows B over the direct expansion cooling coil 35, gives up heat to the cold evaporator coil 35 containing the vaporizing refrigerant. Such air is chilled to a temperature of about 45° F., which air is much too cold to be introduced directly into a clean room or the like habitable space mentioned previously. Accordingly, it is necessary to warm such cold air to a temperature of about 66° F., and it is usually desirable and necessary to maintain such air at a temperature of plus or minus $\frac{1}{10}$ of a degree from the desired temperature of 66° F. or any other selected temperature.

Prior art hot-gas, by-pass systems that are readily available only regulate the refrigerant pressure and temperature at the direct expansion cooling coil 35. Flow of hot gaseous refrigerant to the direct expansion cooling coil 35 is effected through conduits 39 to a by-pass regulator SOL-1. Thence, the hot refrigerant flows through conduit 41 to pressure valve PCV-2 and through conduits 43, 13 and 45 that communicate directly with the hot gas in the conduit portion 47 of the thermal expansion valve 31.

Commercially available hot gas by-pass regulators, such as SOL-1, have a range of pressure fluctuations from 2–6 lbs., which is too wide a range to be effective in providing very close temperature control in a controlled environmental facility, such as a gage room or the clean room mentioned hereinbefore.

In order to compensate for these pressure fluctuations, a pressure-actuated, automatic diverting valve PCV-1 is installed in a conduit 49 communicating with conduit 39 and a hot gaseous refrigerant storage tank 51.

Associated with the hot gaseous refrigerant storage tank 51 is a blind pressure control device PC-1 that is in communication with PCV-1 and the tank 51, to maintain the pressure in the tank 51 at equilibrium at all times.

In some instances, the valves SOL-1 and PCV-1 may, if preferred, be direct or pilot operated pressure actuated valves for full modulation from 0 to 100% of capacity of the valves.

The valves SOL-1 and PCV-1 may also be pneumatically or electrically operated, provided the sensor utilized is capable of 0-100% modulation.

Hot gaseous refrigerant flows from storage tank 51 through conduits 53 and 55 to the temperature control valve TCV-1 and then through conduit 57 into a reheating coil 59. A check valve CKV-1 prevents flow of hot refrigerant from conduit 14 into the tank 51. The heating coil 59 may also serve as a preheating coil for a second stage reheating device (not shown) that is similar in function to reheating coil 59, but which serves as the final heating source before the tempered air is introduced into the environmental room.

Thus, hot gaseous refrigerant passes through the reheating coil 59 and therein gives up heat to the cold air flowing over the coils. The air moving out of the reheating coil device 59, in the direction of the arrows A, is now heated to a temperature of 66° F.

The condensed liquid refrigerant flows out of the reheating coil 59 through conduit 61 into conduit 25.

A temperature control sensor 63 and controller TC-1 are associated with the reheating coil 59 and they monitor the temperature of the air leaving the reheating coil 59. Such sensor 63 and controller TC-1 control the temperature control valve TCV-1 so that the temperature of the air leaving the reheating coil 59 is maintained within the preselected very close temperature range; that is, within $\frac{1}{10}$ of a degree above and below the preselected temperature. In the instance described herein, the preselected air temperature is 66° F.

The reheating coil 59 serves as a temperature stabilizer due to the mass of the coil which will not allow sudden or quick changes in the temperature of the air leaving the heating coil 59.

In a particular installation, where very close temperature control is necessary and desirable, and where a second reheating coil is used, such final reheating coil may be heated either with steam, hot water, or electricity depending upon the accuracy of temperature control required in the environmental facility.

In some instances, a desuperheating valve TX-2 may also be incorporated into the suction line 13 if desired where it serves only to protect the compressor 15 from high refrigerant suction line temperatures which could occur should valve SOL-1 fail in the open position.

From the foregoing those skilled in the art will recognize many significant features and advantages in the invention among which are:

That a portion of the hot pressurized gaseous refrigerant flows into a heat sink and refrigerant pressure equalizer whereby the conventional cooling coil operates at nearly perfect, non-fluctuating pressure and temperature, which is vital for the performance of a close temperature and humidity facility;

That the utilization of heat in the hot pressurized gaseous refrigerant warms the chilled air significantly, reducing the energy costs for conventional final reheat systems whether the same is heated by steam, hot water, or electricity;

That the total refrigerating capacity of the condensing unit which previously had to be expanded in the cooling coil is significantly reduced;

And that, in accordance with the invention, when total cooling capacity is not required, due to a no-load situation in the environmental facility, the excess capacity of the compressor is diverted to offset cooling effect of the coil thereby making the system less expensive to operate and extremely efficient.

What is claimed is:
1. In a system wherein a gaseous refrigerant is pressurized and is condensed while hot to a pressurized liquid which expands in apparatus through which air passes and gives up heat to the expanded gaseous refrigerant vapor, such air being chilled, the improvement comprising:
   (a) a first conduit means for carrying a portion of hot pressurized gases refrigerant to
   (b) a receptacle for holding such hot pressurized gases refrigerant; and
   (c) second conduit means for carrying said hot pressurized gaseous refrigerant from said receptacle to a
   (d) means for heating said chilled air.
2. The invention of claim 1 including:
   (a) pressure control valve means in said first conduit means for regulating the pressure of the gaseous refrigerant flowing to said receptacle; and
   (b) means for maintaining the pressure in said receptacle at preselected equilibrium pressure.
3. The invention of claim 1 wherein:
   (a) said means for heating the chilled air comprises a heating coil which carries said hot gaseous refrigerant and over which said chilled air passes.
4. The invention of claim 2 including:
   (a) temperature control valve means in said second conduit means for regulating the temperature of the gaseous refrigerant flowing through said means for heating the chilled air; and
   (b) temperature sensor means in contact with air leaving said air heating means, which sensor regulates the operation of said temperature control valve when the temperature of the air varies outside of a preselected temperature range.
5. In a system wherein a gaseous refrigerant is pressurized and is condensed while hot to a pressurized liquid which expands in apparatus through which air passes and gives up heat to the expanded gaseous refrigerant vapor, such air being chilled, the improvement comprising:
   (a) conduit means carrying a portion of said hot pressurized gaseous refrigerant to
   (b) a receptacle for holding such hot pressurized gaseous refrigerant at preselected equilibrium pressure;
   (c) pressure control valve means in said first conduit means for controlling the pressure of the gaseous refrigerant flowing into said receptacle;
   (d) means for maintaining the pressure in said receptacle at preselected equilibrium pressure;
   (e) second conduit means carrying said hot pressurzed gaseous refrigerant to
   (f) means for heating the chilled air;
   (g) means in said second conduit means for controlling the temperature of the refrigerant flowing therein; and
   (h) temperature sensor and control means in contact with the air leaving said means for heating said chilled air for actuating said means for controlling the temperature of refrigerant flowing in said conduit.
6. The invention of claim 5 including:
   (a) means for carrying said refrigerant away from said air heating means.

References Cited

UNITED STATES PATENTS 3,264,840  8/1966  Harnish _____ 62—173
3,362,184  1/1968  Tensey _____ 62—173

WILLIAM J. WYE, Primary Examiner

U.S. Cl. X.R.

62—90